United States Patent
Kakishima et al.

(10) Patent No.: US 10,693,616 B2
(45) Date of Patent: Jun. 23, 2020

(54) BASE STATION, USER EQUIPMENT, AND METHOD OF CSI-RS TRANSMISSION

(71) Applicants: NTT DOCOMO, INC., Tokyo (JP); DOCOMO Innovations, Inc., Palo Alto, CA (US)

(72) Inventors: Yuichi Kakishima, Palo Alto, CA (US); Satoshi Nagata, Palo Alto, CA (US); Chongning Na, Beijing (CN); Xiaolin Hou, Beijing (CN); Huiling Jiang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 34 days.

(21) Appl. No.: 15/752,054

(22) PCT Filed: Aug. 12, 2016

(86) PCT No.: PCT/US2016/046766
§ 371 (c)(1),
(2) Date: Feb. 12, 2018

(87) PCT Pub. No.: WO2017/027799
PCT Pub. Date: Feb. 16, 2017

(65) Prior Publication Data
US 2018/0241532 A1 Aug. 23, 2018

Related U.S. Application Data

(60) Provisional application No. 62/204,904, filed on Aug. 13, 2015.

(51) Int. Cl.
*H04L 5/00* (2006.01)
*H04B 7/06* (2006.01)
*H04W 24/10* (2009.01)

(52) U.S. Cl.
CPC .......... *H04L 5/0057* (2013.01); *H04B 7/0626* (2013.01); *H04L 5/0094* (2013.01); *H04W 24/10* (2013.01)

(58) Field of Classification Search
CPC ... H04L 5/0057; H04L 5/0094; H04B 7/0626; H04W 24/10
(Continued)

(56) References Cited

U.S. PATENT DOCUMENTS 9,326,279 B2  4/2016  Kishiyama
2011/0038302 A1  2/2011  Papasakellariou et al.
(Continued)

FOREIGN PATENT DOCUMENTS

CN  104038312 A  9/2014
EP  2677801 A1  12/2013
(Continued)

OTHER PUBLICATIONS

International Search Report of the International Searching Authority issued in PCT/US2016/046766 dated Dec. 20, 2016 (4 pages).
(Continued)

*Primary Examiner* — Obaidul Huq
(74) *Attorney, Agent, or Firm* — Osha Liang LLP

(57) ABSTRACT

A method of Channel State Information Reference Signal (CSI-RS) transmission from a base station (BS) to a user equipment (UE) includes reserving, with the BS, a CSI-RS resource used for aperiodic CSI-RS transmission in subframes transmitted from the BS, transmitting, from the BS to the UE, reservation information indicating the CSI-RS resource via higher layer signaling, and transmitting, from the BS to the UE, the aperiodic CSI-RS using the CSI-RS resource.

5 Claims, 20 Drawing Sheets

(58) Field of Classification Search
USPC .................................. 370/310, 328, 329
See application file for complete search history.

(56) References Cited

U.S. PATENT DOCUMENTS

| | | | |
|---|---|---|---|
| 2013/0322393 A1* | 12/2013 | Kishiyama ............ | H04L 5/0057 370/329 |
| 2014/0211646 A1 | 7/2014 | Ji et al. | |
| 2014/0313912 A1 | 10/2014 | Jongren et al. | |
| 2014/0334391 A1* | 11/2014 | Khoshnevis ...... | H04W 72/0413 370/329 |
| 2015/0049626 A1 | 2/2015 | Chen et al. | |
| 2015/0244444 A1 | 8/2015 | Mazzarese et al. | |
| 2016/0029238 A1 | 1/2016 | Chen et al. | |
| 2016/0105817 A1* | 4/2016 | Frenne ................. | H04B 7/0626 370/252 |
| 2016/0227519 A1* | 8/2016 | Nimbalker ............ | H04L 5/0094 |
| 2016/0360437 A1* | 12/2016 | Larsson ................ | H04W 24/10 |

FOREIGN PATENT DOCUMENTS

| | | |
|---|---|---|
| EP | 3293911 A1 | 3/2018 |
| WO | 2011019168 A2 | 2/2011 |
| WO | 2011019168 A3 | 6/2011 |
| WO | 2014071638 A1 | 5/2014 |
| WO | 2014116775 A1 | 7/2014 |
| WO | 2014/183680 A1 | 11/2014 |

OTHER PUBLICATIONS

Witten Opinion of the International Searching Authority issued in PCT/US2016/046766 dated Dec. 20, 2016 (9 pages).

3GPP TS 36.211 V12.6.0; "3rd Generation Partnership Project; Technical Specification Group Radio Access Network; Evolved Universal Terrestrial Radio Access (E-UTRA); Physical channels and modulation; (Release 12)"; Jun. 2015 (136 pages).

3GPP TS 36.213 V12.5.0; "3rd Generation Partnership Project; Technical Specification Group Radio Access Network; Evolved Universal Terrestrial Radio Access (E-UTRA); Physical layer procedures; (Release 12)"; Mar. 2015 (239 pages).

Office Action issued in the counterpart European Patent Application No. 16754628.2, dated Apr. 23, 2019 (14 pages).

NTT DOCOMO; "Views on eICIC Schemes for Rel-10"; 3GPP TSG RAN WG1 Meeting #62bis R1-105724; Xian, China, Oct. 11-15, 2010 (9 pages).

Extended European Search Report issued in European Application No. 19204858.5, dated Jan. 20, 2020 (9 pages).

\* cited by examiner

FIG. 3

| CSI-RS SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |

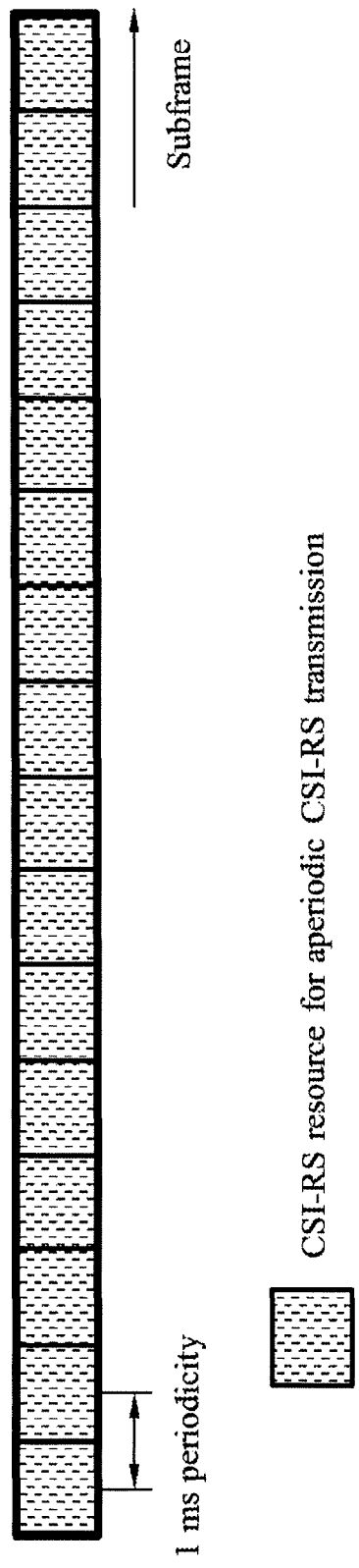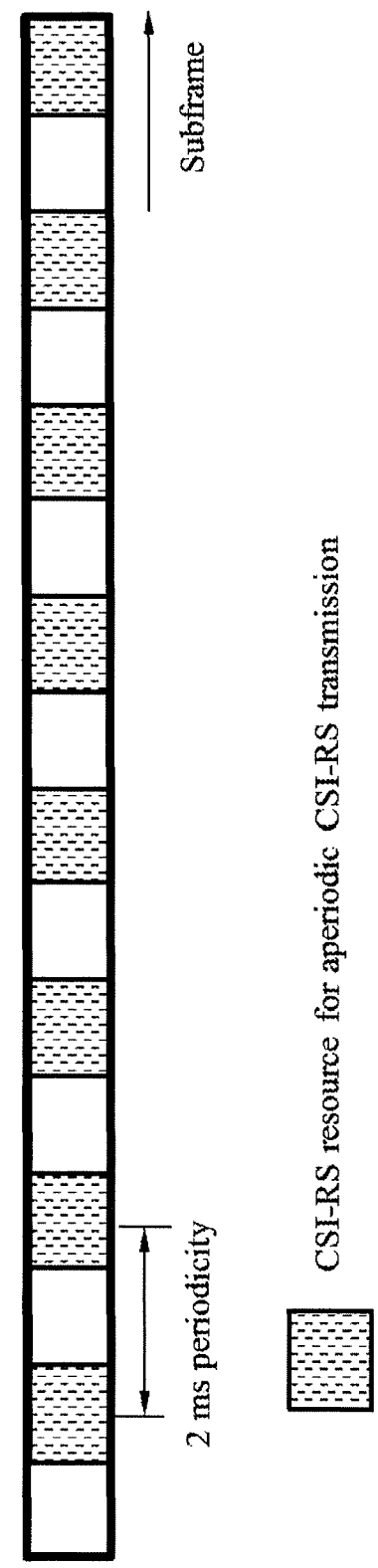

FIG. 8

| CSI-RS SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |
| 155 | 1 | $I_{CSI-RS} - 1$ |
| 156-157 | 2 | $I_{CSI-RS} - 2$ |
| ⋮ | ⋮ | ⋮ |

FIG. 9A

Mapping from CSI-RS configuration to $(k', l')$ for normal cyclic prefix

<table>
<tr><th rowspan="3"></th><th rowspan="3">CSI-RS configuration</th><th colspan="6">Number of CSI reference signals configured</th></tr>
<tr><th colspan="2">1 or 2</th><th colspan="2">4</th><th colspan="2">8</th></tr>
<tr><th>$(k',l')$</th><th>$n_s \bmod 2$</th><th>$(k',l')$</th><th>$n_s \bmod 2$</th><th>$(k',l')$</th><th>$n_s \bmod 2$</th></tr>
<tr><td rowspan="20">Frame structure type 1 and 2</td><td>0</td><td>(9,5)</td><td>0</td><td>(9,5)</td><td>0</td><td>(9,5)</td><td>0</td></tr>
<tr><td>1</td><td>(11,2)</td><td>1</td><td>(11,2)</td><td>1</td><td>(11,2)</td><td>1</td></tr>
<tr><td>2</td><td>(9,2)</td><td>1</td><td>(9,2)</td><td>1</td><td>(9,2)</td><td>1</td></tr>
<tr><td>3</td><td>(7,2)</td><td>1</td><td>(7,2)</td><td>1</td><td>(7,2)</td><td>1</td></tr>
<tr><td>4</td><td>(9,5)</td><td>1</td><td>(9,5)</td><td>1</td><td>(9,5)</td><td>1</td></tr>
<tr><td>5</td><td>(8,5)</td><td>0</td><td>(8,5)</td><td>0</td><td></td><td></td></tr>
<tr><td>6</td><td>(10,2)</td><td>1</td><td>(10,2)</td><td>1</td><td></td><td></td></tr>
<tr><td>7</td><td>(8,2)</td><td>1</td><td>(8,2)</td><td>1</td><td></td><td></td></tr>
<tr><td>8</td><td>(6,2)</td><td>1</td><td>(6,2)</td><td>1</td><td></td><td></td></tr>
<tr><td>9</td><td>(8,5)</td><td>1</td><td>(8,5)</td><td>1</td><td></td><td></td></tr>
<tr><td>10</td><td>(3,5)</td><td>0</td><td></td><td></td><td></td><td></td></tr>
<tr><td>11</td><td>(2,5)</td><td>0</td><td></td><td></td><td></td><td></td></tr>
<tr><td>12</td><td>(5,2)</td><td>1</td><td></td><td></td><td></td><td></td></tr>
<tr><td>13</td><td>(4,2)</td><td>1</td><td></td><td></td><td></td><td></td></tr>
<tr><td>14</td><td>(3,2)</td><td>1</td><td></td><td></td><td></td><td></td></tr>
<tr><td>15</td><td>(2,2)</td><td>1</td><td></td><td></td><td></td><td></td></tr>
<tr><td>16</td><td>(1,2)</td><td>1</td><td></td><td></td><td></td><td></td></tr>
<tr><td>17</td><td>(0,2)</td><td>1</td><td></td><td></td><td></td><td></td></tr>
<tr><td>18</td><td>(3,5)</td><td>1</td><td></td><td></td><td></td><td></td></tr>
<tr><td>19</td><td>(2,5)</td><td>1</td><td></td><td></td><td></td><td></td></tr>
</table>

FIG. 9B

| CSI-RS configuration | Number of CSI reference signals configured | | | | | |
|---|---|---|---|---|---|---|
| | 1 or 2 | | 4 | | 8 | |
| | $(k',l')$ | $n_s \bmod 2$ | $(k',l')$ | $n_s \bmod 2$ | $(k',l')$ | $n_s \bmod 2$ |
| 20 | (11,1) | 1 | (11,1) | 1 | (11,1) | 1 |
| 21 | (9,1) | 1 | (9,1) | 1 | (9,1) | 1 |
| 22 | (7,1) | 1 | (7,1) | 1 | (7,1) | 1 |
| 23 | (10,1) | 1 | (10,1) | 1 | | |
| 24 | (8,1) | 1 | (8,1) | 1 | | |
| 25 | (6,1) | 1 | (6,1) | 1 | | |
| 26 | (5,1) | 1 | | | | |
| 27 | (4,1) | 1 | | | | |
| 28 | (3,1) | 1 | | | | |
| 29 | (2,1) | 1 | | | | |
| 30 | (1,1) | 1 | | | | |
| 31 | (0,1) | 1 | | | | |

Frame structure type 2 only

FIG. 9C

Mapping from CSI reference signal configuration to $(k', l')$ for extended cyclic prefix

| | CSI-RS configuration | Number of CSI-RSs configured | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure type 1 and 2 | 0 | (11,4) | 0 | (11,4) | 0 | (11,4) | 0 |
| | 1 | (9,4) | 0 | (9,4) | 0 | (9,4) | 0 |
| | 2 | (10,4) | 1 | (10,4) | 1 | (10,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 only | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |
| | 24 | (6,1) | 1 | | | | |
| | 25 | (2,1) | 1 | | | | |
| | 26 | (1,1) | 1 | | | | |
| | 27 | (0,1) | 1 | | | | |

BASE STATION, USER EQUIPMENT, AND METHOD OF CSI-RS TRANSMISSION

TECHNICAL FIELD

The present invention relates generally to wireless communications and, more particularly, to aperiodic Channel State Information-Reference Signal (CSI-RS) transmission scheme.

BACKGROUND ART

In conventional Long Term Evolution (LTE) systems (e.g., LTE Release 10, 11, and 12), Channel State Information Reference Signals (CSI-RSs) are transmitted periodically. FIG. 1 is a diagram showing subframe configurations of LTE Release 12 and 13, respectively. As shown in FIG. 1, in LTE Release 12, the CSI-RS is transmitted periodically (e.g., 5 ms (millisecond) transmission periodicity). On the other hand, in LTE Release 13, the CSI-RS may be transmitted aperiodically (aperiodic CSI-RS). For example, a user equipment (UE) receive the aperiodic CSI-RSs from a base station (BS), it is required that the UE identifies CSI-RS resources used for the aperiodic CSI-RS transmission in subframes from the BS.

However, conventional LTE standards do not support how to reserve CSI-RS resources for aperiodic CSI-RS transmission and how to transmit and receive the aperiodic CSI-RS between the BS and the UE. As a result, the UE may not be capable of identifying the CSI-RS resource for the aperiodic CSI-RS in the subframes transmitted from the BS. Thus, the aperiodic CSI-RS may not be properly performed.

CITATION LIST

Non-Patent Reference

[Non-Patent Reference 1] 3GPP, TS 36.211 V 12.6.0
[Non-Patent Reference 2] 3GPP, TS 36.213 V 12.5.0

SUMMARY OF THE INVENTION

According to one or more embodiments of the present invention, a method of Channel State Information Reference Signal (CSI-RS) transmission from a base station (BS) to a user equipment (UE) may comprise reserving, with the BS, a CSI-RS resource used for aperiodic CSI-RS transmission in subframes transmitted from the BS, transmitting, from the BS to the UE, reservation information indicating the CSI-RS resource via higher layer signaling, and transmitting, from the BS to the UE, the aperiodic CSI-RS using the CSI-RS resource.

According to one or more embodiments of the present invention, a base station (BS) may comprise a controller that reserves a CSI-RS resource used for aperiodic Channel State Information Reference Signal (CSI-RS) transmission in subframes transmitted from the BS and a transmitter that transmits, to a user equipment (UE), reservation information indicating the CSI-RS resource via higher layer signaling, and the aperiodic CSI-RS using the CSI-RS resource.

According to one or more embodiments of the present invention, a user equipment (UE) may comprise a receiver that receives, from the BS, reservation information indicating a Channel State Information Reference Signal (CSI-RS) resource used for aperiodic CSI-RS transmission in downlink subframes, and an aperiodic Channel State Information Reference Signal (CSI-RS) using the CSI-RS resource.

According to one or more embodiments of the present invention, a user equipment (UE) may comprise a receiver that receives Channel State Information Reference Signals (CSI-RSs) from a base station (BS); and a controller that performs CSI estimation based on the CSI-RSs. The controller may not allow performance of averaging the CSI estimation results when each of the CSI-RSs are transmitted on different subframes.

According to one or more embodiments of the present invention, the aperiodic CSI-RS transmission can be performed properly.

BRIEF DESCRIPTION OF THE DRAWINGS

FIG. 3 is a diagram showing a CSI-RS subframe configuration according to one or more embodiments of the present invention.

FIGS. 5A, 5B, 5C, and 5D are a diagram showing reserved CSI-RS resources for aperiodic CSI-RS transmission according to one or more embodiments of the first example of the present invention.

FIG. 8 is a diagram showing a CSI-RS subframe configuration according to one or more embodiments of the second example of the present invention.

FIGS. 9A and 9B are a diagram showing mapping from a CSI-RS configuration to REs for a normal cyclic prefix according to one or more embodiments of a third example of the present invention.

FIG. 9C is a diagram showing mapping from a CSI-RS configuration to REs for an extended cyclic prefix according to one or more embodiments of the third example of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(System Configuration)

A wireless communication system 1 according to one or more embodiments of the present invention will be described below with reference to FIG. 2.

Figure 2:
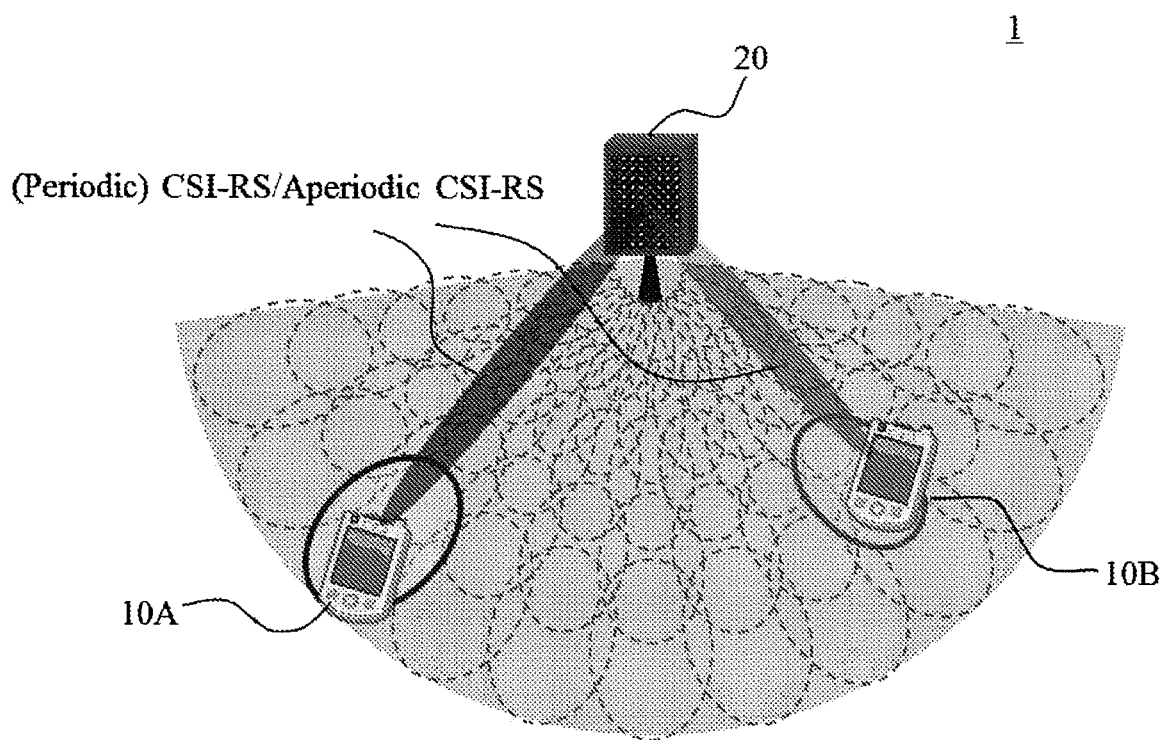
FIG. 2 is a diagram showing a configuration of a wireless communication system according to one or more embodiments of the present invention.

As shown in FIG. 2, the wireless communication system 1 comprises user equipments (UEs) 10 (UE 10A and UE 10B), and a base station BS 20. The wireless communication system 1 may be an LTE/LTE-Advanced (LTE-A) system, New Radio (NR), or other systems. The wireless communication system 1 is not limited to the specific configurations described herein and may be any type of wireless communication system.

The BS 20 may communicate uplink (UL) and downlink (DL) signals with the UE 10. The BS 20 may be Evolved NodeB (eNB). The BS 20 may receive DL signals from network equipment such as upper nodes or servers connected on a core network via the access gateway apparatus, and transmits the DL signals to the UE 10. The BS 20 receives uplink packets from the UE 10 and transmits the UL signals to the network equipment.

The BS 20 includes an antenna (e.g., 2D or 3D MIMO antenna) to transmit radio signals between the UE 10, a communication interface to communicate with an adjacent BS 20 (for example, X2 interface), a communication interface to communicate with the core network (for example, S1 interface), and a CPU (Central Processing Unit) such as a processor or a circuit to process transmitted and received signals with the UE 10. Functions and processing of the BS 20 described below may be implemented by the processor processing or executing data and programs stored in a memory. However, the BS 20 is not limited to the hardware configuration set forth above and may include any appropriate hardware configurations. Generally, a number of the BSs 20 are disposed so as to cover a broader service area of the wireless communication system 1.

The BS 20 may transmit Channel State Information Reference Signals (CSI-RSs) to the UE 10. The BS 20 may transmit the CSI-RS aperiodically (aperiodic CSI-RS). The BS 20 may transmit the (periodic) CSI-RS with a CSI-RS transmission periodicity (5, 10, 20, 40, or 80 ms (millisecond) periodicity) based on a table as shown FIG. 3. The table (CSI-RS subframe configuration) in FIG. 3 is defined in Table 6.10.5.3-1 of the 3GPP TS 36.211.

The UE 10 may transmit and receive radio signals such as data signals and control signals between the base station 20 and the UE 10. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, functions and processing of the UE 10 described below may be implemented by the CPU processing or executing data and programs stored in a memory. However, the UE 10 is not limited to the hardware configuration set forth above and may be configured with, e.g., a circuit to achieve the processing described below.

First Example

According to one or more embodiments of a first example of the present invention, the BS 20 may reserve CSI-RS resources for the aperiodic CSI-RS transmission and transmit the aperiodic CSI-RS using the reserved CSI-RS resources. In one or more embodiments of the present invention, the CSI-RS resource may be a resource used for the CSI-RS transmission in subframes transmitted from the BS 20.

Figure 4:
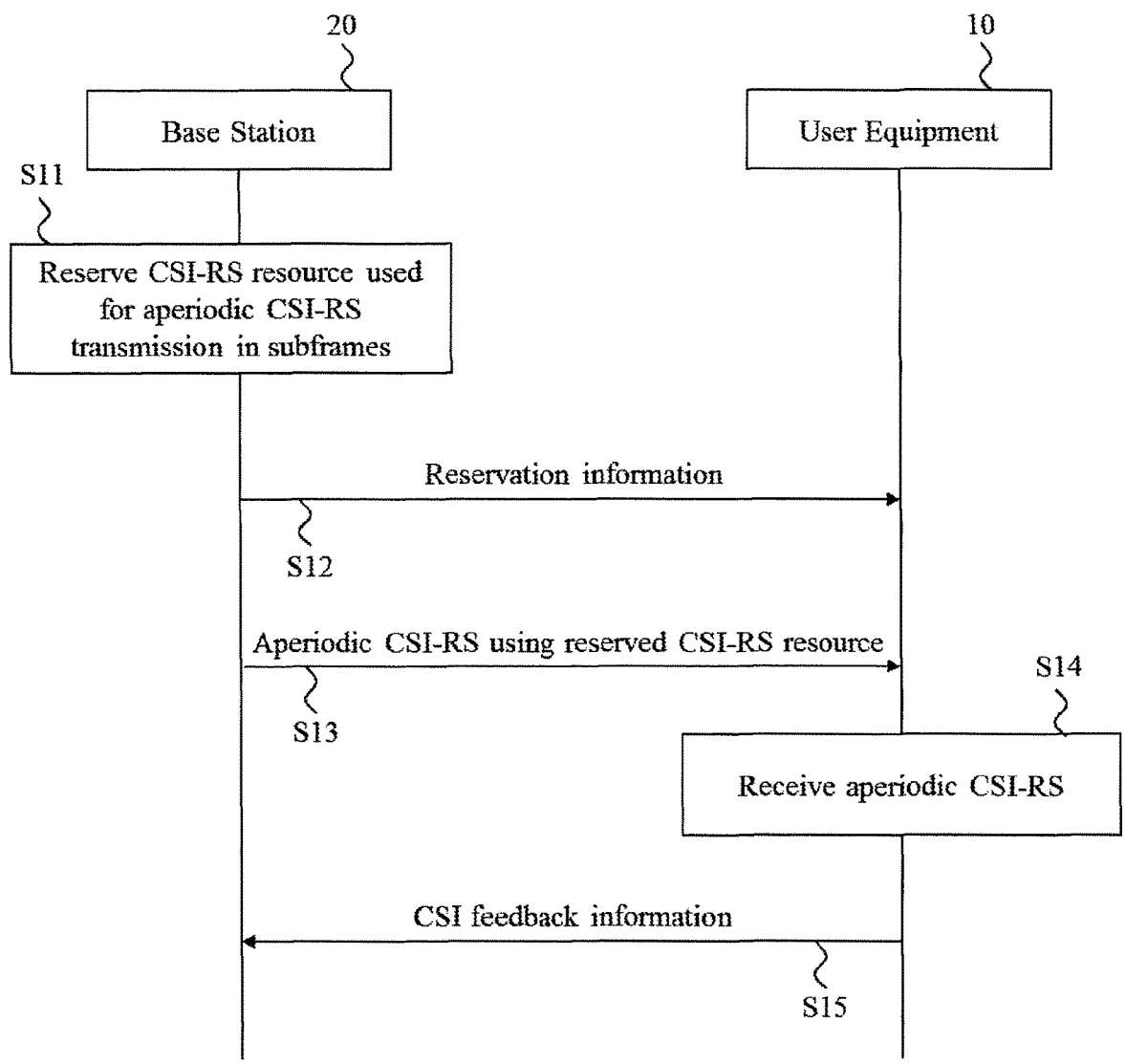
FIG. 4 is a sequence diagram showing an example operation for aperiodic CSI-RS transmission according to one or more embodiments of a first example of the present invention.

FIG. 4 is a sequence diagram showing aperiodic CSI-RS transmission according to one or more embodiments of the first example of the present invention. As shown in FIG. 4, the BS 20 may reserve the CSI-RS resources used for aperiodic CSI-RS transmission in subframes transmitted from the BS 20 (step S11). Examples of the reserved CSI-RS resources for the aperiodic CSI-RS transmission will be described with reference to FIGS. 5A-5D.

Figure 5C:
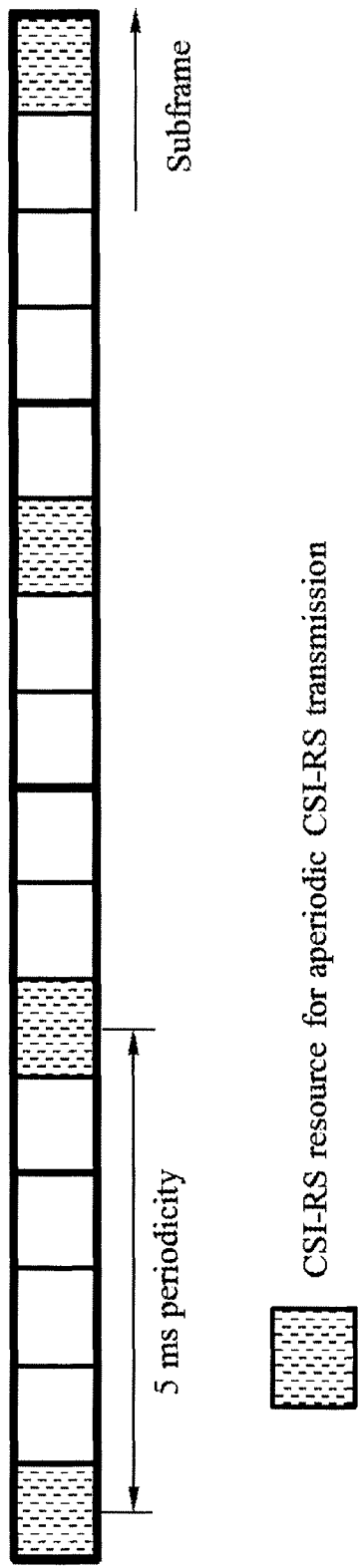
Figure 5D:
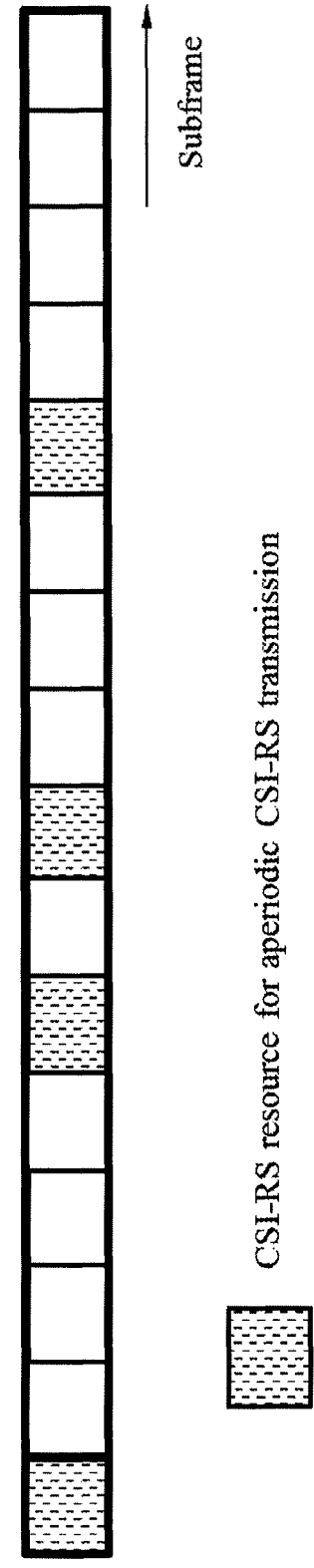

As shown in FIGS. 5A-5C, the CSI-RS resources for the aperiodic CSI-RS transmission may be reserved at predetermined periodicity. In an example of FIG. 5A, the CSI-RS resources for the aperiodic CSI-RS transmission may be reserved at 1 ms periodicity. That is, when the predetermined periodicity is 1 ms periodicity, the CSI-RS resources for the aperiodic CSI-RS transmission may be reserved in all subframes transmitted from the BS 20. In an example of FIG. 5B, the CSI-RS resources for the aperiodic CSI-RS transmission may be reserved at 2 ms periodicity. In an example of FIG. 5C, the CSI-RS resources for the aperiodic CSI-RS transmission may be reserved at 5 ms periodicity. In one or more embodiments of the present invention, the predetermined periodicity is not limited to 1, 2, and 5 ms periodicity and may be predetermined values such as 3, 10, 20 ms periodicity. As shown in FIG. 5D, the CSI-RS resources for the aperiodic CSI-RS transmission may be reserved at random in the subframes.

Turning to FIG. 4, the BS 20 may transmit reservation information indicating the reserved CSI-RS resource via higher layer signaling such as Radio Resource Control (RRC) signaling to the UE 10 (step S12). For example, when the CSI-RS resources are reserved at the predetermined periodicity, the reservation information may indicate the predetermined periodicity. For example, the reserved information may be included in a CSI process.

The BS 20 may transmit the aperiodic CSI-RS using the reserved CSI-RS resources to the UE 10 (step S13).

The UE 10 may detect the CSI-RS resources from the subframes transmitted from the BS 20 based on the received reservation information. Then, when the detected CSI-RS resource includes the aperiodic CSI-RS, the UE 10 may receive the aperiodic CSI-RS in the detected CSI-RS resource (step S14). Furthermore, for example, when the reservation information includes the predetermined periodicity, the UE 10 may detect the CSI-RS resource from the subframes at the predetermined periodicity.

The UE 10 may transmit CSI feedback information based on reception of the aperiodic CSI-RS (step S15). The CSI feedback information may include existing CSI, such as rank indicator (RI), precoding matrix index (PMI), channel quality information (CQI) and CSI-RS resource indicator (CRI). As another implementation, the CSI may be newly defined one. As a result, the aperiodic CSI-RS transmission can be performed properly between the BS 20 and the UE 10.

Modified First Example

According to one or more embodiments of a modified first example of the present invention, when the reservation information does not include the predetermined periodicity, at the step S14, the UE 10 may assume the CSI-RS resource is reserved at 1 ms periodicity, that is, each of the subframes transmitted from the BS 20 includes the CSI-RS resource. The UE 10 may receive the aperiodic CSI-RS based on the assumed CSI-RS resource.

Figure 6:
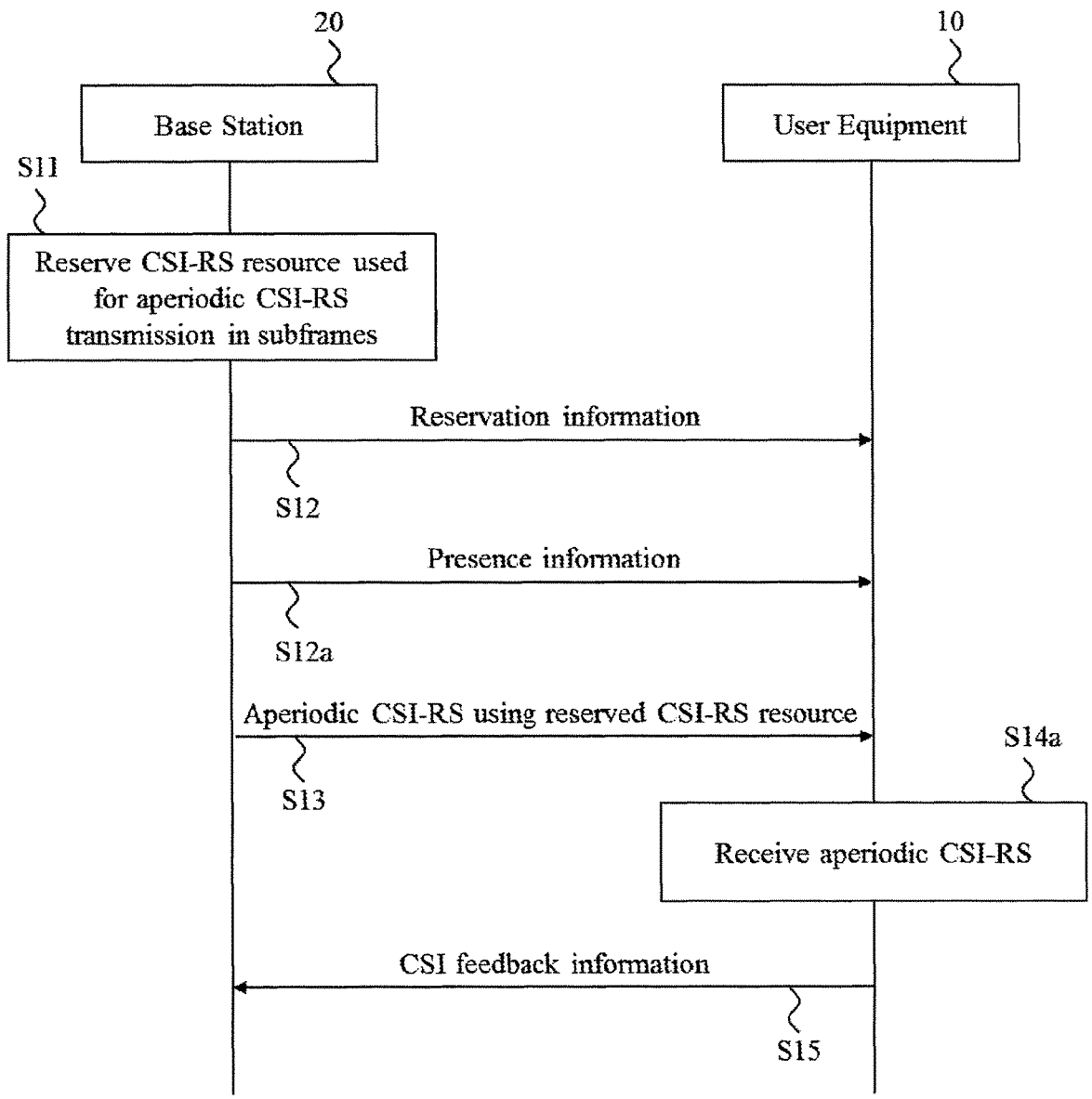
FIG. 6 is a sequence diagram showing an example operation for aperiodic CSI-RS transmission according to one or more embodiments of a modified first example of the present invention.

In one or more embodiments of the first example of the present invention, the BS 20 may transmit the aperiodic CSI-RS using the reserved CSI-RS resources. However, for example, even if the CSI-RS resources are reserved at the predetermined periodicity or at random, the BS 20 may not transmit the aperiodic CSI-RSs at a predetermined duration. In such a case, the reserved CSI-RS resources may not include the aperiodic CSI-RSs at the predetermined duration. According to one or more embodiments of a modified first example of the present invention, the BS 20 may transmit presence information indicating whether the CSI-RS resource includes the aperiodic CSI-RS. FIG. 6 is a sequence diagram showing an example operation for aperiodic CSI-RS transmission according to one or more embodiments of the modified first example of the present invention. Similar steps in FIG. 6 to steps in FIG. 4 may have the same reference labels.

As shown in FIG. 6, at a step S12*a*, the BS 20 may transmit the presence information to the UE 10. The presence information may indicate whether the reserved CSI-RS resource includes the aperiodic CSI-RS. Furthermore, the presence information may further indicate transmission timing of the aperiodic CSI-RS included in the CSI-RS resource. For example, the presence information may be transmitted via a Physical Downlink Control Channel (PDCCH) or an enhanced PDCCH (ePDCCH). Thus, the presence information may be included in Downlink Control Information (DCI) format. Furthermore, for example, the presence information may be transmitted via at least one of the higher layer signaling such as the RRC signaling.

In FIG. 6, the UE 10 may monitor the PDCCH or ePDCCH (presence information). At a step S14*a*, when the presence information indicates the CSI-RS resource includes the aperiodic CSI-RS, the UE 10 may perform a reception operation of the aperiodic CSI-RS and then may receive the aperiodic CSI-RS in the CSI-RS resource. For example, when the presence information indicates the transmission timing, the UE 10 may receive the aperiodic CSI-RS in the CSI-RS resource at the transmission timing. Thus, the UE 10 can identify whether the CSI-RS resource in the subframes includes the aperiodic CSI-RS.

As another example, according to one or more embodiments of a modified first example of the present invention, the BS 20 may transmit an aperiodic CSI-RS parameter indicating a CSI-RS is the aperiodic CSI-RS rather than the periodic CSI-RS via the RRC signaling.

As another example, according to one or more embodiments of a modified first example of the present invention, the CSI-RS resource may not be multiplexed on the Physical Downlink Shared Channel (PDSCH). For example, PDSCH muting may be performed at 1 ms or 2 ms periodicity. That is, duty cycle/subframe offset of a muting subframe configuration may include the subframe of which transmission periodicity is one or two subframe.

As another example, according to one or more embodiments of a modified first example of the present invention, the BS 20 may transmit a CSI request to the UE 10. The aperiodic CSI-RS may be triggered when the CSI request is transmitted. Furthermore, the UE 10 may transmit aperiodic CSI feedback information based on the aperiodic CSI-RS after a lapse of a predetermined time from when the UE 10 receives the CSI request.

Second Example

Figure 7:
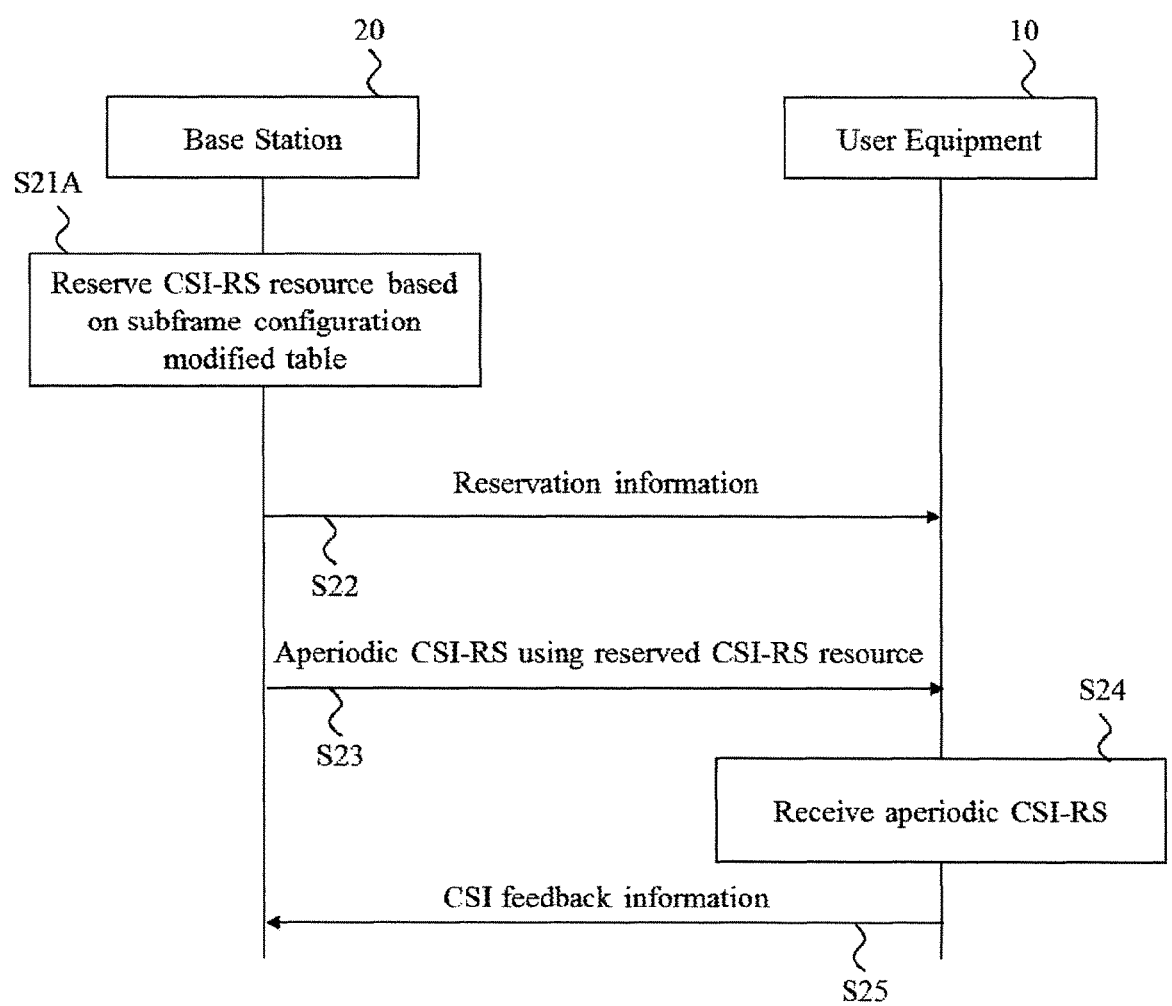
FIG. 7 is a sequence diagram showing an example operation for aperiodic CSI-RS transmission according to one or more embodiments of a second example of the present invention.

According to one or more embodiments of a second example of the present invention, as shown in FIG. 7, the BS 20 may reserve the CSI-RS resource for the aperiodic CSI-RS transmission based on a modified Table 6.10.5.3-1 of the 3GPP TS 36.211 (subframe configuration modified table) (step S21). Steps S22 to S25 of FIG. 7 correspond to steps S12-S15 of FIG. 4.

FIG. 8 shows the subframe configuration modified table according to one or more embodiments of the second example. For example, in the subframe configuration modified table in FIG. 8, indexes 155, 156 and 157 of CSI-RS-SubframeConfig $I_{CSI\text{-}RS}$ (CSI-RS subframe configuration) may be added to the conventional table in FIG. 3 defined in Table 6.10.5.3-1 of the 3GPP TS 36.211. For example, CSI-RS-SubframeConfig $I_{CSI\text{-}RS}$ "155", "156", and "157" may be associated with CSI-RS transmission periodicity 1 ms and 2 ms and the CSI-RS subframe offset "$I_{CSI\text{-}RS}$-1" and "$I_{CSI\text{-}RS}$-2", respectively. That is, the subframe configuration modified table that secures CSI-RS subframe resources in high density may increase CSI-RS subframe transmission opportunity. As a result, for example, in the aperiodic CSI-RS transmission, when the BS 20 designates CSI-RS-SubframeConfig $I_{CSI\text{-}RS}$ "155" and then transmits CSI-RS-SubframeConfig $I_{CSI\text{-}RS}$ "155" to the UE 10, the UE 10 can specify the CSI-RS resource including the aperiodic CSI-RS in subframes transmitted from the BS 20 because the UE 10 may assume the CSI-RS transmission periodicity is 1 ms periodicity. The subframe configuration modified table may be Table 6.10.5.3-1 without some of the indexes (rows) so as to increase CSI-RS subframe transmission opportunity relatively. The subframe configuration modified table can be also applied for legacy periodic CSI-RS.

Third Example

When the BS 20 transmits the aperiodic CSI-RS, the BS 20 may determine a location where the CSI-RS is mapped to at least a portion of resource elements (REs) in a resource block (RB) in a subframe including the CSI-RS resource based on the conventional table (CSI-RS configuration) defined in Table 6.10.5.2-1 or 6.10.5.2-2, as shown in FIGS. 9A and 9B or 9C. That is, in the aperiodic CSI-RS transmission in accordance with one or more embodiments, the BS 20 may transmit to the UE 10 one of the indexes for the CSI-RS configuration in 9A and 9B or 9C to report which one of the twenty pairs of REs allocated to the CSI-RS antenna ports is used.

Furthermore, the BS 20 may transmit one of the indexes for the CSI-RS configuration in FIGS. 9A and 9B or 9C via the higher layer signaling such as the RRC signaling. One of the indexes for the CSI-RS configuration may be mapping information that indicates the location where the CSI-RS is mapped to at least a portion of REs in the RB in the CSI-RS subframe.

Fourth Example

Embodiments of a fourth example of the present invention will be described below. According to one or more embodiments of the fourth example, the BS 20 may designate (determine) aperiodic CSI-RS resources dynamically.

Figure 10:
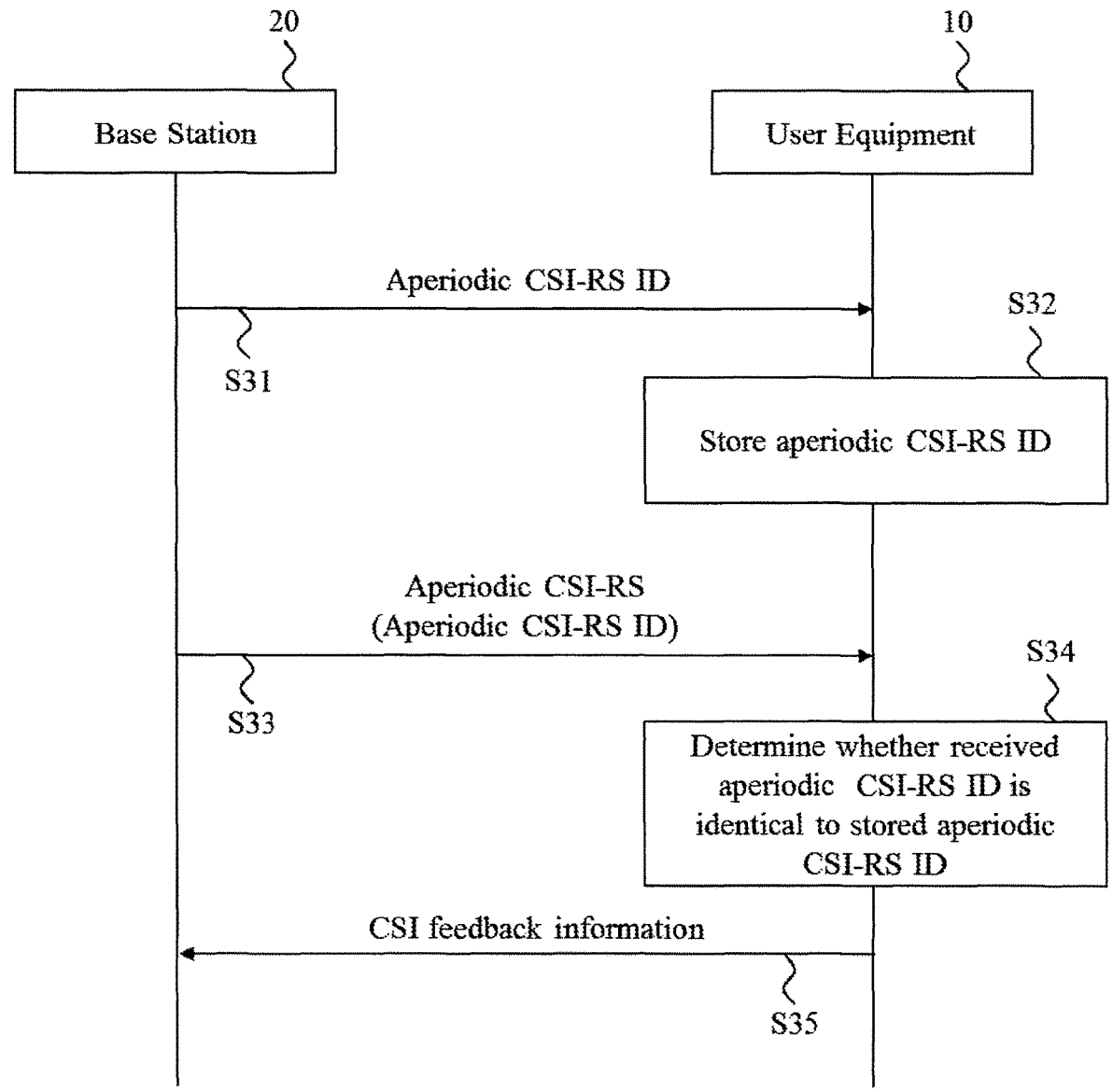
FIG. 10 is a sequence diagram showing aperiodic CSI-RS transmission according to one or more embodiments of a fourth example of the present invention.

FIG. 10 is a sequence diagram showing aperiodic CSI-RS transmission according to one or more embodiments of the fourth example. As shown in FIG. 10, the BS 20 may transmit aperiodic CSI-RS ID via lower layer signaling such as DCI (step S31). The aperiodic CSI-RS ID is identity information that indicates the aperiodic CSI-RS that should be received by the UE 10.

The UE 10 stores the aperiodic CSI-RS ID in the memory (step S32). The BS 20 may transmit aperiodic CSI-RS including an aperiodic CSI-RS ID (step S33).

The UE 10 may determine whether the received aperiodic CSI-RS ID is identical to the stored aperiodic CSI-RS ID (step S34). For example, the UE 10 compares the RRC configured aperiodic CSI-RS ID with the dynamically signaled aperiodic CSI-RS ID.

As a result of comparison, when they are coincident, the UE 10 may receive the aperiodic CSI-RS, and then transmit the CSI feedback information to the BS 20 (step S35). On the other hand, as a result of comparison, when they are not coincident, the UE 10 may not receive the aperiodic CSI-RS.

According to one or more embodiments of a modified fourth example of the present invention, the BS 20 may notify the UE 10 regarding whether the UE 10 should receive the aperiodic CSI-RS or not via DCI.

According to one or more embodiments of the modified fourth example, the BS 20 may transmit UE-specific ID that indicates a user equipment that should receive a subframe transmitted from the BS 20 for each subframe via lower layer signaling such as DCI.

Figure 1:
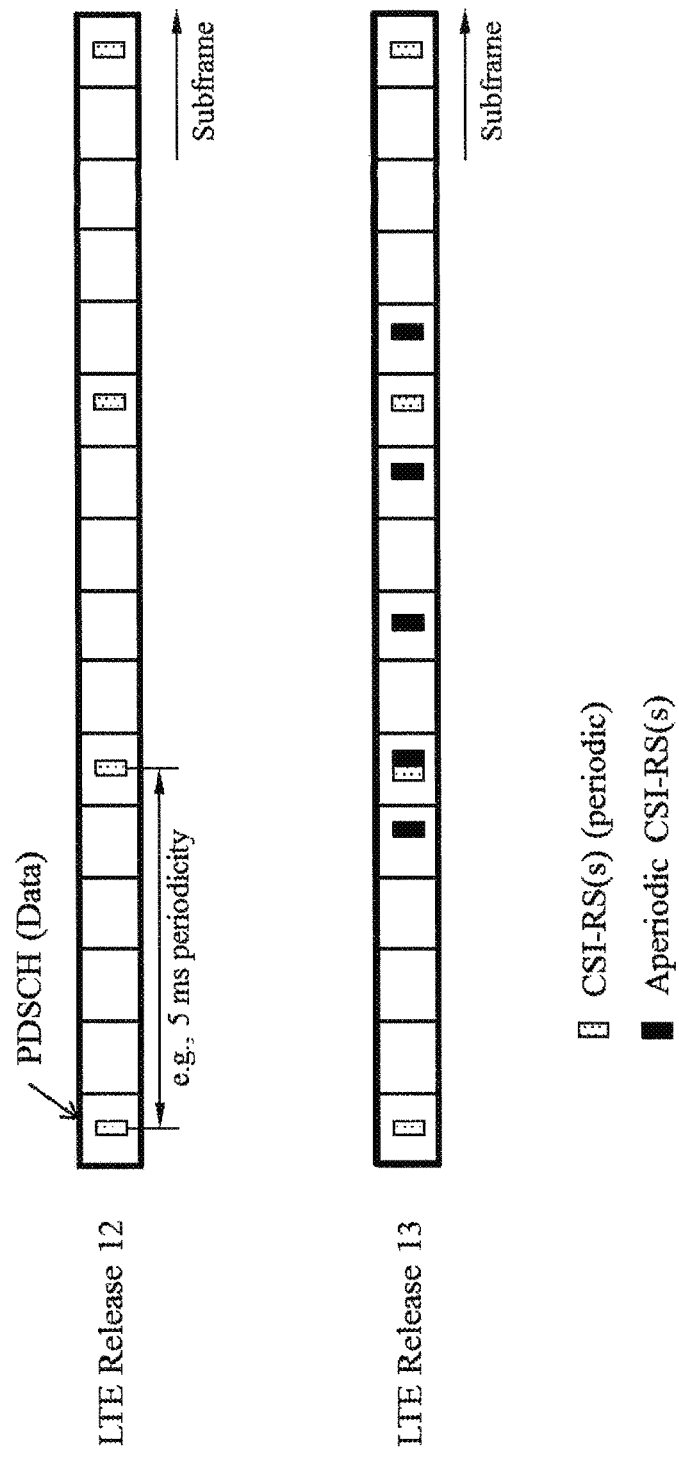
FIG. 1 is a diagram showing subframes for (periodic) CSI-RS and aperiodic CSI-RS transmission of LTE Release 12 and 13 respectively.

According to one or more embodiments of the modified fourth example, the lower layer signaling may be used for each RE allocated to CSI-RS. For example, when three pairs of REs (e.g., a pair of REs is indicates as "0" and "1" on the same pattern at the upper left in FIG. 1) are allocated to CSI-RSs, the BS 20 may transmit information for each pair of REs which are indicated as bitmaps such as "1 1 0". For example, indexes "1" and "0" of the information indicates presence and absence of aperiodic CSI-RS transmission, respectively.

According to one or more embodiments of the modified fourth example, the BS 20 may transmit the aperiodic CSI-RS ID and/or the UE-specific ID by using UE-specific Search Space or Common Search Space.

According to one or more embodiments of the modified fourth example of the present invention, the UE 10 may estimate transmission REs for PDSCH based on the aperiodic CSI-RS transmission information. For example, the UE 10 may perform rate matching based on the CSI-RS transmission information.

Fifth Example

Figure 11:
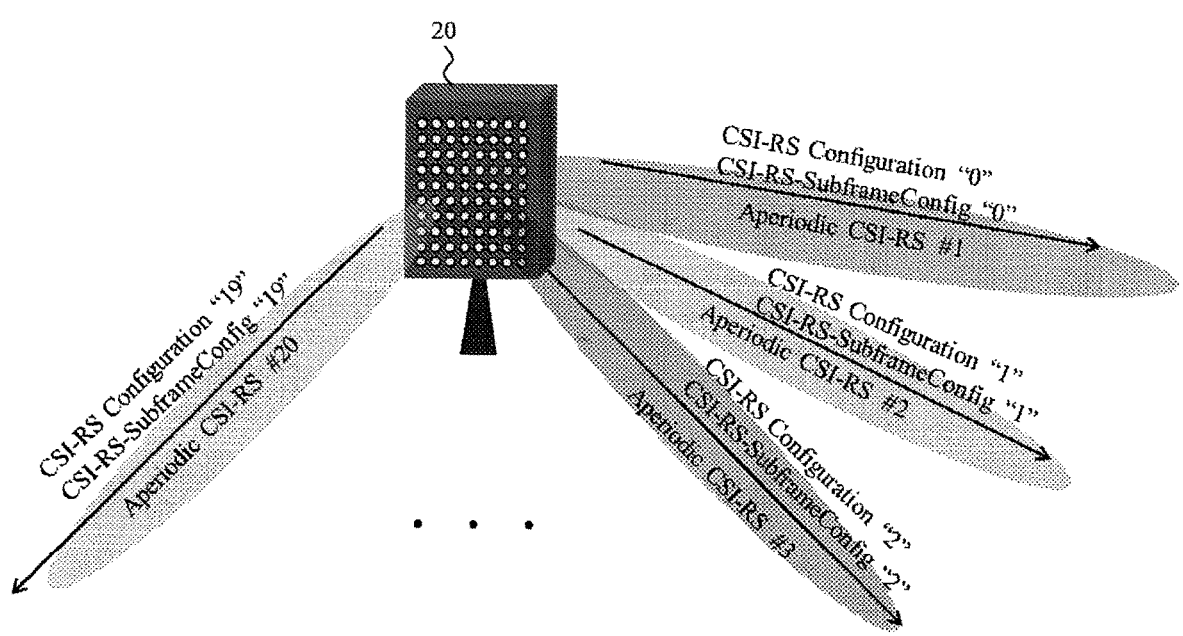
FIG. 11 is a diagram showing a CSI-RS configuration and a CSI-RS subframe configuration according to one or more embodiments of a fifth example of the present invention.

According to one or more embodiments of a fifth example, as shown in FIG. 11, when the BS 20 transmits a plurality of aperiodic CSI-RSs (e.g., #1-20), the BS 20 may determine the CSI-RS configuration and the CSI-RS subframe configuration (CSI-RS-SubframeConfig) for aperiodic CSI-RSs, respectively. For example, the BS 20 may determine the CSI-RS configuration index "0" and the CSI-RS subframe configuration index "0" for aperiodic CSI-RS #1. The BS 20 may determine the CSI-RS configuration index "1" and the CSI-RS subframe configuration index "1" for aperiodic CSI-RS #2.

Modified Fifth Example

Figure 12:
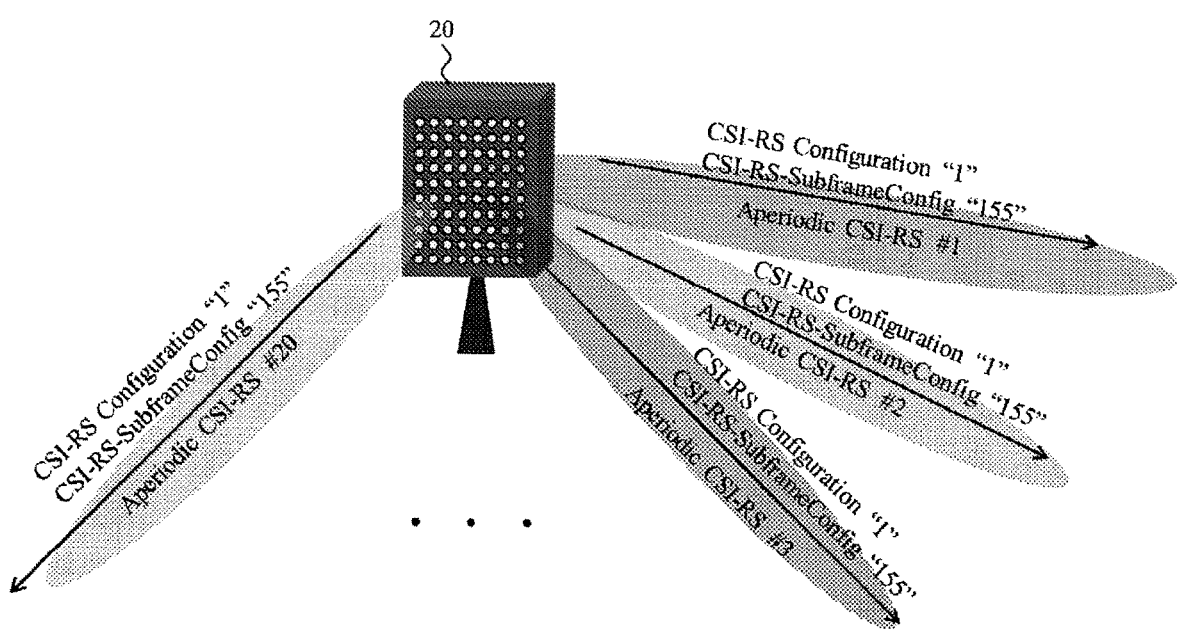
FIG. 12 is a diagram showing a CSI-RS configuration and a CSI-RS subframe configuration according to one or more embodiments of a modified fifth example of the present invention.

According to one or more embodiments of a modified fifth example, as shown in FIG. 12, when the BS 20 transmits a plurality of aperiodic CSI-RSs (e.g., #1-20) which are time-multiplexed, the BS 20 may determine the CSI-RS configuration and the CSI-RS subframe configuration (CSI-RS-SubframeConfig) for aperiodic CSI-RSs so that the CSI-RS configuration and the CSI-RS subframe configuration are common. For example, the BS 20 may determine the CSI-RS configuration index "1" and the CSI-RS subframe configuration index "155" for aperiodic CSI-RS #1. The BS 20 may determine the CSI-RS configuration index "1" and the CSI-RS subframe configuration index "155" for aperiodic CSI-RS #2. This makes it possible to decrease consumption of CSI-RS resources.

According to one or more embodiments of a modified fifth example of the present invention, when the BS 20 may transmit a plurality of aperiodic CSI-RSs, the BS 20 may determine the CSI-RS subframe configuration (CSI-RS-SubframeConfig) for aperiodic CSI-RSs so that the CSI-RS subframe configuration is common. The BS 20 may determine the different CSI-RS configuration for each of the plurality of aperiodic CSI-RSs in the RB. That is, the BS 20 may determine the location where the plurality of aperiodic CSI-RSs are mapped to REs in the RB in the CSI-RS subframe. According to this, it is possible to decrease consumption of CSI-RS resources.

According to one or more embodiments of the modified fifth example, the configuration of aperiodic CSI-RS may use conventional higher layer signaling such as RRC information (e.g., CSI-Process, CSI-RS-Config, CSI-RS-ConfigNZP, CSI-RS-ConfigZP, or CSI-RS-IdentityNZP).

Sixth Example

Figure 13A:
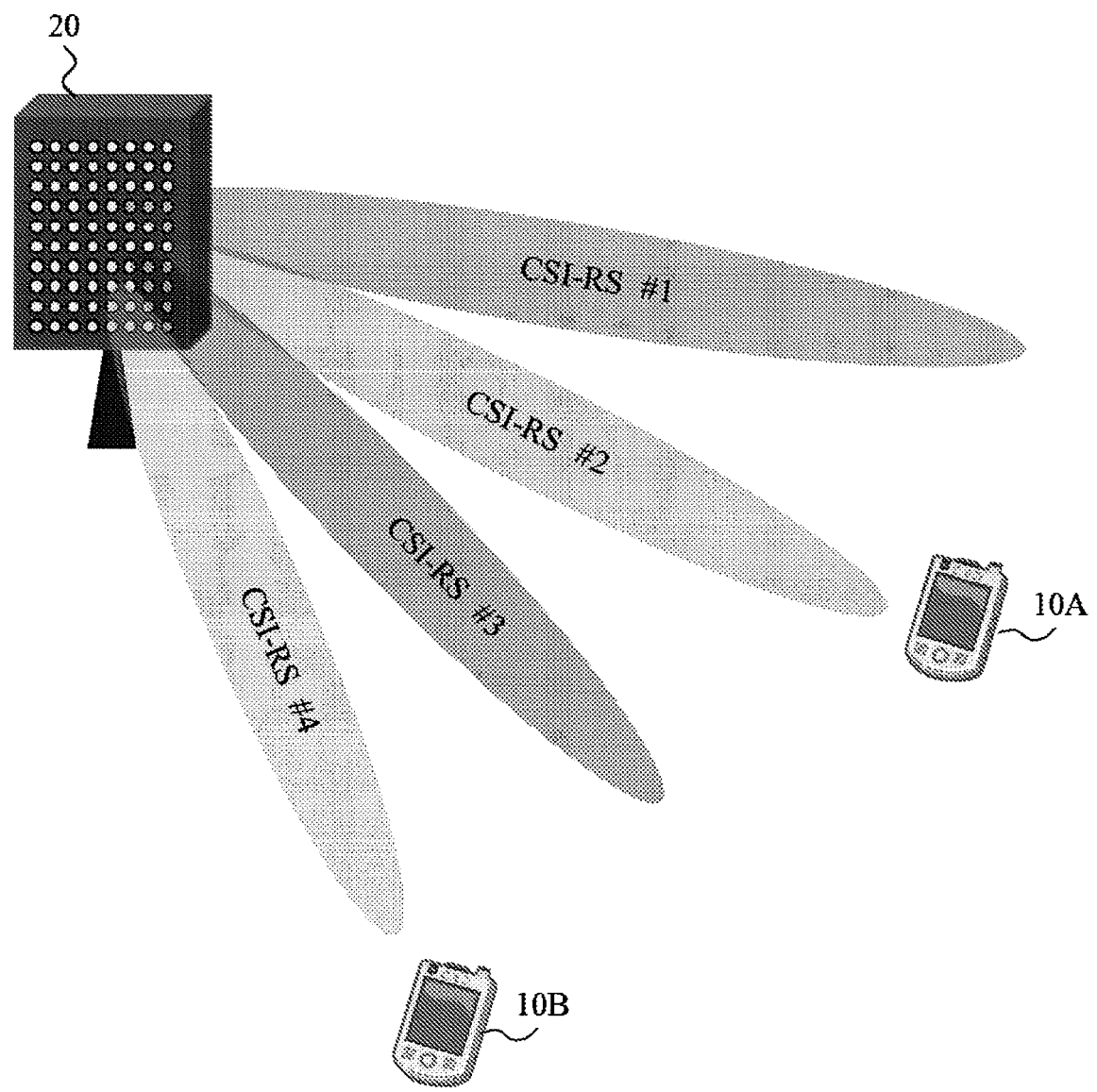
FIG. 13A is a diagram showing CSI-RS transmission according to one or more embodiments of a sixth example of the present invention.

Embodiments of a sixth example of the present invention will be described with reference to FIGS. 13A and 13B. According to one or more embodiments of the six example of the present invention, the UE 10 may not allow performance of averaging the CSI estimation results when each of the CSI-RSs are transmitted on different subframes from the BS 20. As shown in FIG. 13A, when the BS 20 transmits a plurality of CSI-RSs, the plurality of CSI-RSs may be multiplied by different precoders, respectively. For example, averaging results of CSI-RS estimation in different subframes should not be conducted. That is, CSI calculation may use only triggered downlink subframes.

Figure 13B:
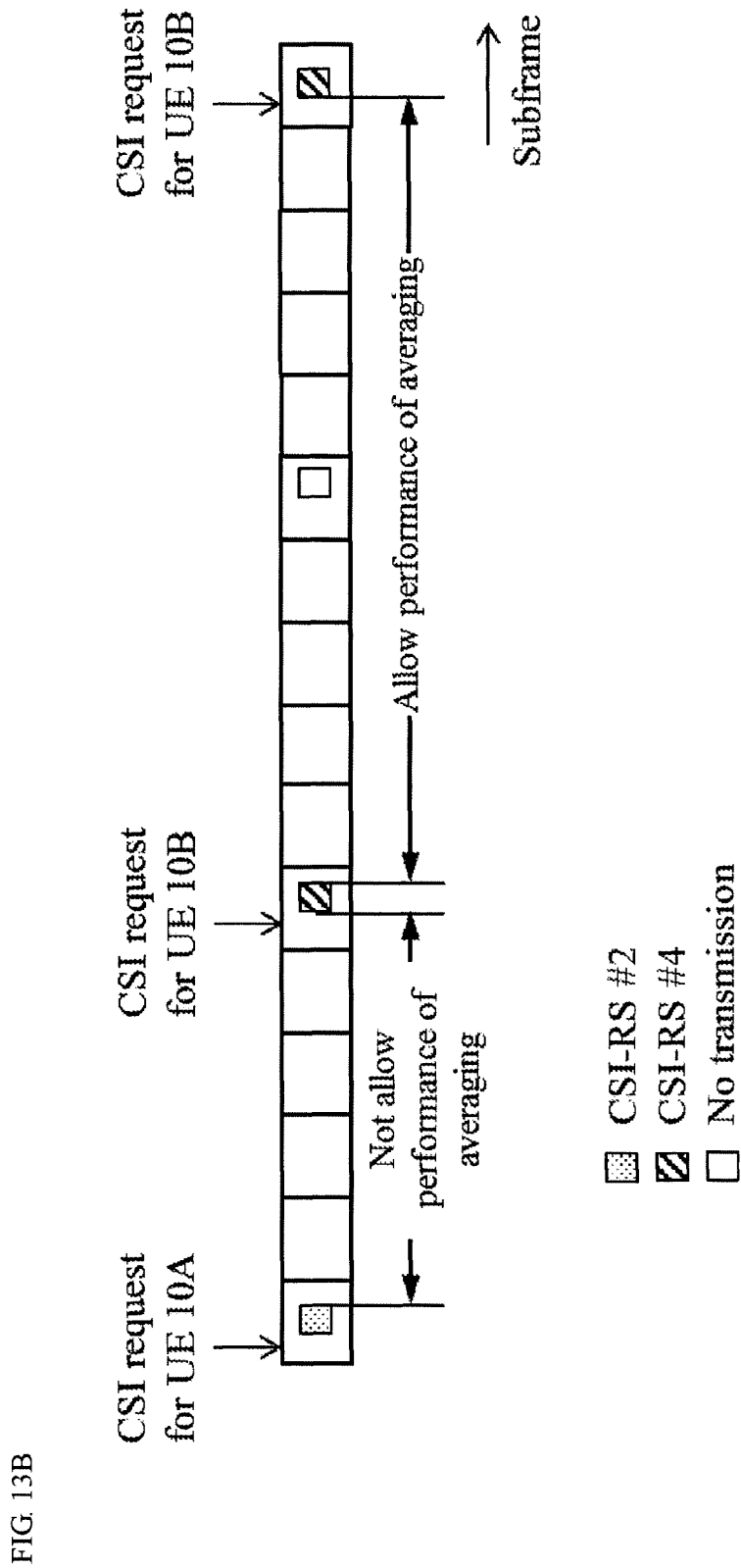
FIG. 13B is a diagram showing a CSI-RS subframe configuration according to one or more embodiments of the sixth example of the present invention.

As shown in FIG. 13B, CSI-RSs transmitted to the same UE 10 (UE 10B in FIG. 13) may be multiplied by the same beam. In this case, allowing for averaging between subframes may cause accuracy of the CSI estimation to be increased.

For example, averaging in triggered subframes that receives a CSI request may be allowed in some cases. In other words, the UE 10 may assume that the same precoder is multiplied for multiple subframes. Therefore, an indicator to allow averaging in subframes can be transmitted. As one example, signaling indicate whether the UE 10 can assume averaging or not with previous subframe(s). It can be designated by the same bits in CSI-RS triggering field. As another example, applicability of averaging can be determined by higher layer signaling. For example, it is possible to have an indicator to indicate whether allocated CSI-RS can assume averaging or not. As another example, the UE 10 can assume that all aperiodic CSI-RS is not allowed to conduct averaging in different subframe. Further, averaging in subframes designated by different bits in CSI-RS triggering field may not be allowed. Further still, when CSI process and RRC signaling of NZP CSI-RS are reconfigured, averaging may be initialized.

Seventh Example

Figure 14:
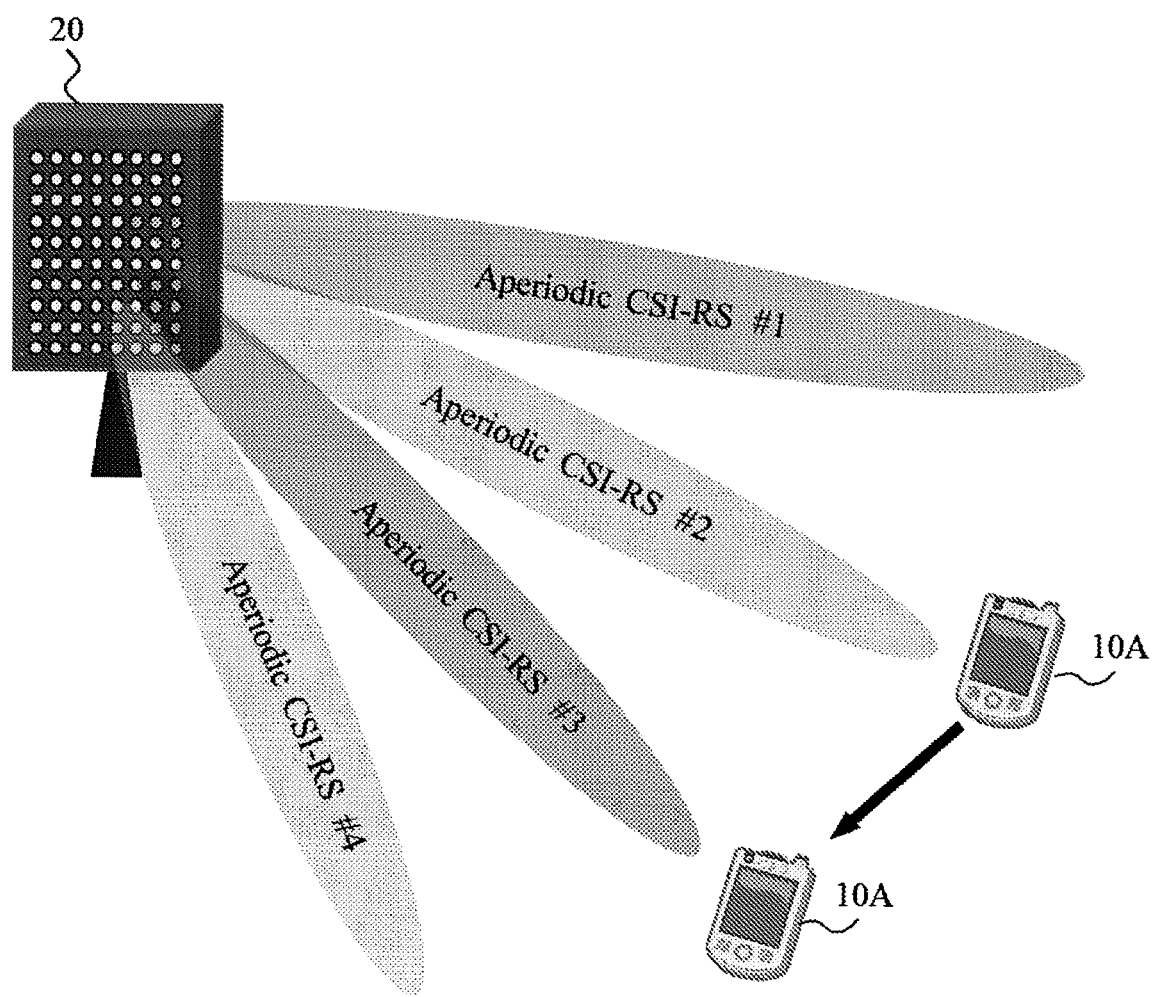
FIG. 14 is a diagram showing aperiodic CSI-RS transmission according to one or more embodiments of a seventh example of the present invention.

Embodiments of a seventh example of the present invention will be described below. According to one or more embodiments, as shown in FIG. 14, when the UE 10A moves between cells, even in the CSI-RS for the same UE 10, the applied beam may be changed. In such a case, allowing for averaging between subframes may not result in accurate CSI.

Therefore, for example, the BS 20 may dynamically transmit signaling that indicates a change of an applied precoder (whether UE 10 can conduct averaging or not). Further, the BS 20 may transmit signaling that indicates whether a multiplied precoder is the same as a multiplied precoder applied to previous subframes or previous triggering subframes.

As another example, timing (e.g., 100 ms) of reset may be provided instead of using dynamic signaling. For example, timing not to allow for averaging at each predetermined TTI may be provided. Further, a duration and a timing offset may be configured by higher layer or may be defined as a fixed value.

These assumptions can differ for CSI feedback for PUSCH and PUCCH. For example, PUCCH based feedback may be derived without averaging assumption, because PUCCH based feedback does not have DCI triggering. On the other hand, PUSCH based feedback may assume averaging in some cases.

As another example, in the assumption of Further enhanced Inter-Cell Interference Coordination (FeICIC) or enhancement for DL-UL Interference Management and Traffic Adaptation (eIMTA), a plurality of subframe sets may be configured. In the CSI-RS for the same UE 10, averaging in different subframe sets should not be allowed. For example, when the subframe sets are the same, averaging may be allowed. On the other hand, when the subframe sets are different, averaging may be not allowed. For example, assumption for averaging is signaled per subframe set. For example, assumption for averaging is commonly signaled for subframe set.

As another example, CSI-RS may apply a single beamforming in a whole system band. In such a case, UE can assume that the same precoder is assumed to be multiplied in the whole system.

As another example, CSI-RS may apply a different beamforming by a specific frequency unit. In such a case, averaging over frequency blocks may not be appropriate. For example, averaging of results of CSI-RS estimation within a predetermined frequency block may be allowed. In other words, CSI may be calculated in assumption of the same multiplied precoder. Further, a frequency block may be the same as sub band defined currently. For example, a frequency block may be the same as a precoding resource block group (PRG) defined currently.

This concept (applicability of averaging in time/frequency domain) can be also considered for interference measurement. The UE assumption and/or signaling can be introduced to interference measurement.

(Configuration of Base Station)

The BS 20 according to one or more embodiments of the present invention will be described below with reference to the FIG. 15.

Figure 15:
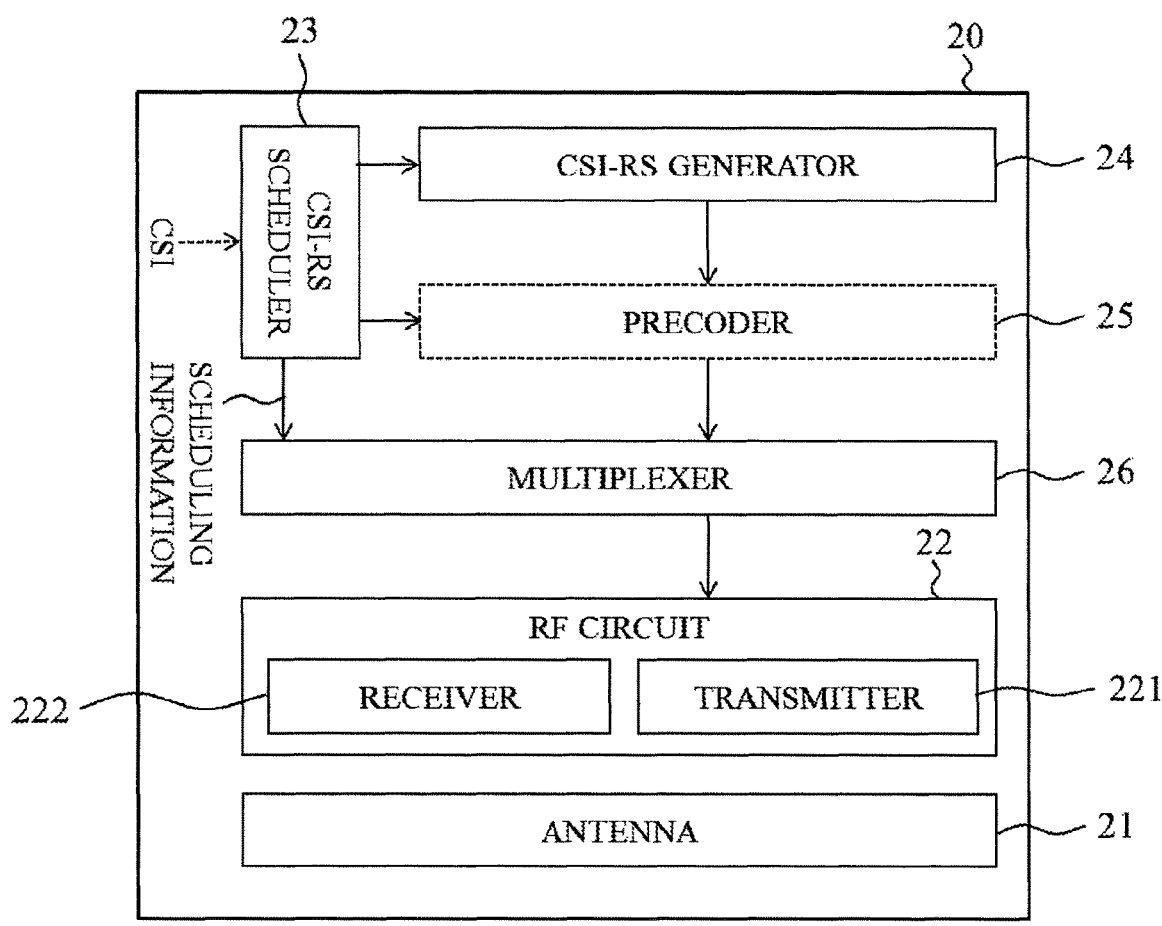
FIG. 15 is a block diagram showing a schematic configuration of a base station according to one or more embodiments of the present invention.
Figure 16:
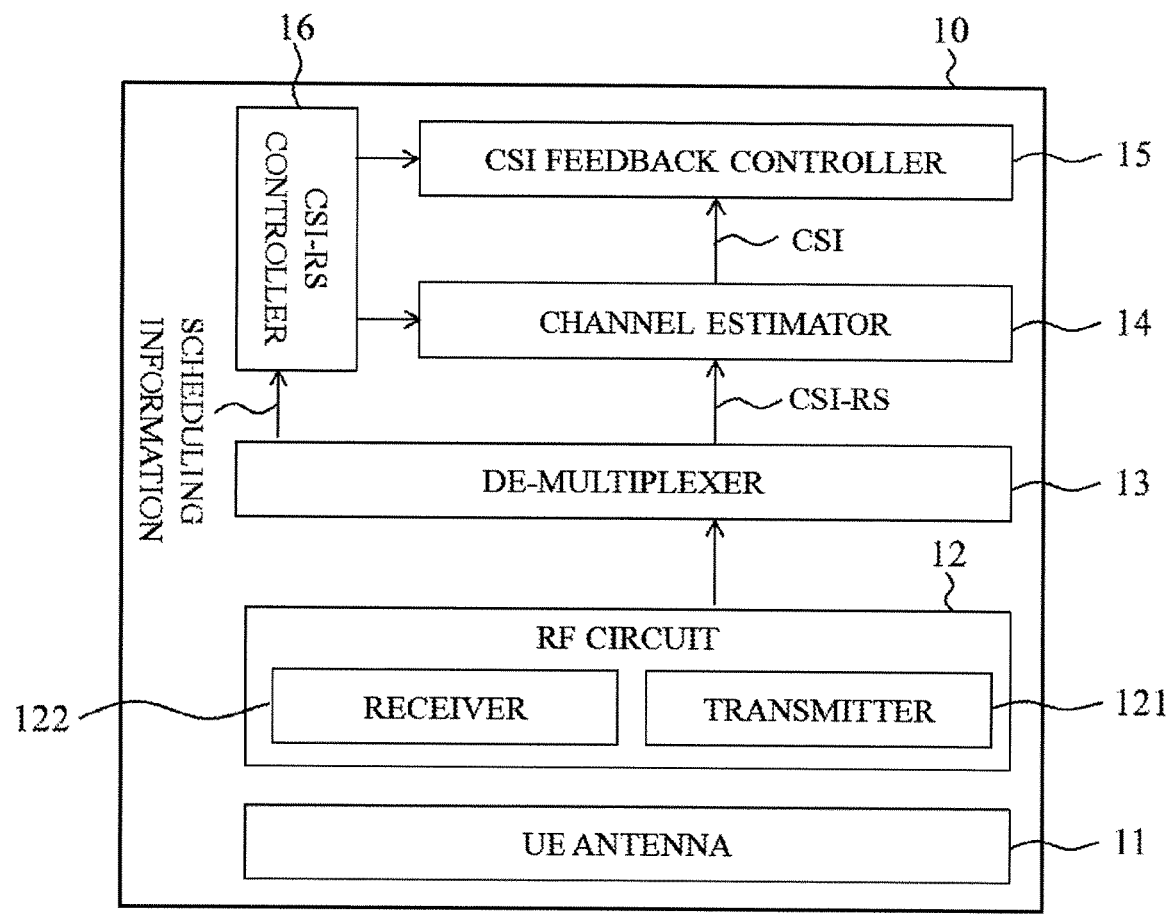
FIG. 16 is a block diagram showing a schematic configuration of a UE according to one or more embodiments of the present invention.

As shown in FIG. 15, the BS 20 may comprise an antenna 21, a Radio Frequency (RF) Circuit 22, a CSI-RS scheduler 23, a CS-RS generator 24, a precoder 25, and a multiplexer 26. The RF circuit 22 includes a transmitter (TXRU) 221 and a receiver 222.

The antenna 21 may comprise a multi-dimensional antenna that includes multiple antenna elements such as a 2D antenna (planar antenna) or a 3D antenna such as antennas arranged in a cylindrical shape or antennas arranged in a cube. The antenna 21 includes antenna ports having one or more antenna elements. The beam transmitted from each of the antenna ports is controlled to perform 3D MIMO communication with the UE 10.

The antenna 21 allows the number of antenna elements to be easily increased compared with linear array antenna. MIMO transmission using a large number of antenna elements is expected to further improve system performance. For example, with the 3D beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

The RF circuit 22 generates input signals to the antenna 21 and performs reception processing of output signals from the antenna 21.

The transmitter 221 included in the RF circuit 22 transmits data signals (for example, reference signals and precoded data signals) via the antenna 21 to the UE 10. The transmitter 221 may transmit (periodic) CSI-RSs and aperiodic CSI-RSs.

The receiver 222 included in the RF circuit 22 receives data signals (for example, reference signals and the CSI feedback information) via the antenna 21 from the UE 10.

The CSI-RS scheduler 23 reserves CSI-RS resources for the CSI-RS transmission in subframes. For example, the CSI-RS scheduler 23 determines the CSI-RS resource for the aperiodic CSI-RS transmission in subframes.

The CSI-RS generator 24 generates the CSI-RS for estimating the downlink channel states. The CSI-RS generator 24 may generate reference signals defined by the LTE standard, dedicated reference signal (DRS) and Cell-specific Reference Signal (CRS), synchronized signals such as Primary synchronization signal (PSS) and Secondary synchronization signal (SSS), and newly defined signals in addition to CSI-RS The precoder 25 determines a precoder applied to the downlink data signals and the downlink reference signals. The precoder is called a precoding vector or more generally a precoding matrix. The precoder 25 determines the precoding vector (precoding matrix) of the downlink based on the CSI indicating the estimated downlink channel states and the decoded CSI feedback information inputted.

The multiplexer 26 multiplexes CSI-RS on REs.

The transmitted reference signals may be Cell-specific or UE-specific. For example, the reference signals may be multiplexed on the UE-specific signal such as PDSCH, and the reference signal may be precoded. Here, by notifying a transmission rank of reference signals to the UE 10, estimation for the channel states may be realized at the suitable rank according to the channel states.

(Configuration of User Equipment)

The UE 10 according to one or more embodiments of the present invention will be described below with reference to the FIG. 15.

As shown in FIG. 15, the UE 10 may comprise a UE antenna 11 used for communicating with the BS 20, an RF circuit 12, a de-multiplexer 13, a channel estimator 14, CSI feedback controller 15, and a CSI-RS controller 16. The RF circuit 12 includes a transmitter 121 and a receiver 122.

The transmitter 121 included in the RF circuit 12 transmits data signals (for example, reference signals and the CSI feedback information) via the UE antenna 11 to the BS 20.

The receiver 122 included in the RF circuit 12 receives data signals (for example, reference signals such as CSI-RS) via the UE antenna 11 from the BS 20.

The de-multiplexer 13 separates a PDCCH signal from a signal received from the BS 20.

The Channel estimator 14 estimates downlink channel states based on the CSI-RS transmitted from the BS 20, and then outputs a CSI feedback controller 15.

The CSI feedback controller 15 generates the CSI feedback information based on the estimated downlink channel states using the reference signals for estimating downlink channel states. The CSI feedback controller 15 outputs the generated CSI feedback information to the transmitter 121, and then the transmitter 121 transmits the CSI feedback information to the BS 20. The CSI feedback information may include at least one of Rank Indicator (RI), PMI, CQI, BI and the like.

Other Examples

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A, New Radio (NR), and a newly defined channel and signaling scheme.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
11 UE antenna
12 RF circuit
121 Transmitter
122 Receiver
13 DE Multiplexer
14 Channel estimator
15 CSI feedback controller
16 CSI-RS controller
20 Base station (BS)
21 Antenna
22 RF circuit
221 Transmitter
222 Receiver
23 CSI-RS scheduler
24 CSI-RS generator
25 Precoder
26 Multiplexer

What is claimed is:

1. A terminal comprising:
a receiver that receives information that indicates a Channel State Information Reference Signal (CSI-RS) resource for an aperiodic CSI-RS, and receives the aperiodic CSI-RS by using the CSI-RS resource that is triggered by a CSI request; and
a transmitter that transmits aperiodic CSI based on the aperiodic CSI-RS after a lapse of a given time from receiving the CSI request.

2. The terminal according to claim 1, wherein the receiver receives the aperiodic CSI-RS by using the CSI-RS resource based on a transmission timing of the aperiodic CSI-RS indicated by information signaled by a Radio Resource Control (RRC) signaling.

3. The terminal according to claim 2, wherein the receiver receives a RRC signaling indicative of an aperiodic CSI-RS parameter that indicates that a CSI-RS is the aperiodic CSI-RS.

4. The terminal according to claim 1, wherein the receiver receives a RRC signaling indicative of an aperiodic CSI-RS parameter that indicates that a CSI-RS is the aperiodic CSI-RS.

5. A method for a terminal, comprising:
receiving information that indicates a Channel State Information Reference Signal (CSI-RS) resource for an aperiodic CSI-RS, and receiving the aperiodic CSI-RS by using the CSI-RS resource that is triggered by a CSI request; and
transmitting aperiodic CSI based on the aperiodic CSI-RS after a lapse of a given time from receiving the CSI request.

* * * * *